United States Patent
Redaelli

[11] Patent Number: 5,287,952
[45] Date of Patent: Feb. 22, 1994

[54] DEVICE FOR SELECTIVE TRANSFER OF ROWS OF PRODUCTS BETWEEN PAIRS OF CONVEYOR BELTS

[75] Inventor: Marco Redaelli, Cassina de'Pecchi, Italy

[73] Assignee: Eurosicma S.r.l., Italy

[21] Appl. No.: 15,516

[22] Filed: Feb. 9, 1993

[30] Foreign Application Priority Data

Feb. 25, 1992 [IT] Italy .............. MI92A000406

[51] Int. Cl.⁵ .............................. B65G 47/46
[52] U.S. Cl. ..................... 198/369; 198/433; 198/448
[58] Field of Search ............... 198/369, 433, 448, 362, 198/360, 418, 434

[56] References Cited

U.S. PATENT DOCUMENTS

| | | | |
|---|---|---|---|
| 3,429,416 | 2/1969 | Provost et al. | 198/433 |
| 3,648,820 | 3/1972 | Schafer et al. | 198/433 X |
| 4,166,525 | 9/1979 | Bruno | 198/369 |
| 4,282,964 | 8/1981 | Hogenkamp et al. | 198/433 X |
| 4,499,988 | 2/1985 | Gasser | 198/369 |
| 4,938,336 | 7/1990 | Aquino et al. | 198/369 |
| 4,974,719 | 12/1990 | Chenevard | 198/433 |
| 5,109,650 | 5/1992 | Hogenkamp | 198/369 X |

Primary Examiner—D. Glenn Dayoan
Attorney, Agent, or Firm—Shlesinger, Fitzsimmons & Shlesinger

[57] ABSTRACT

A device (10) for selective transfer of rows of products (11) between pairs of facing upper conveyor belts (12,13) and a lower belt (18) arranged at a right angle. One end of a first upper conveyor belt (12) for arrival of products is inclinable toward a lower belt (18). Beneath each facing end of the upper belts (12, 13) there is an intermediate horizontal shelf (14, 15) for reception and discharge of products. At least the first shelf (15) beneath the second upper belt (13) is inclinable between the horizontal position and a position inclined upward to align with the end of the opposite upper belt (12) inclined downward. At least the other shelf (14) being movable between a high position in which it is aligned with the first shelf (15) in a horizontal position and a low position aligned with the corresponding edge of the lower belt (18).

18 Claims, 5 Drawing Sheets

DEVICE FOR SELECTIVE TRANSFER OF ROWS OF PRODUCTS BETWEEN PAIRS OF CONVEYOR BELTS

BACKGROUND OF THE INVENTION

In the art of conveyance of rows of products along conveyor belts it is often necessary to selectively transfer the products between belts arranged perpendicularly to each other. The transition between belts is always a critical passage. It becomes truly difficult if the products conveyed are delicate and move at high speeds and in addition the products are arranged on the first belt in sequences of transverse rows while they must be fed from the second belt in an aligned continuous sequence. A typical case are the production and packaging lines for food products such as snacks and the like.

Various solutions have been proposed to resolve the problem. The most widely used consists of using three belts, two aligned to form the normal conveyance line for the products and a third arranged beneath the passage zone between the first two belts realising the perpendicular belt. The upper belt of arrival of the products has passage ends on the second belt, which is aligned therewith, which can be inclined downward to reach the lower belt and unload thereon the products. Controlling the inclination of the end of passage it is thus possible to cause the products to continue on the second belt or shunt them toward the perpendicular belt. This system resolves the problem of selection of the products but the passage between the first and third belts is brusque because of their differing inclinations with the horizontal plane.

Again in the known art there have been proposed intermediate elements between the first and third belts composed of a shelf which rotates around an axle parallel with the extension of the third belt to align itself first with the first belt when inclined and thus receive therefrom the products and then with the plane of the third belt and unload thereon the products received. The shelf can include pushers or a short conveyor belt to facilitate reception and subsequent unloading of the products.

This solves the problem of passage between the belts without brusque variations of slope but slows transfer and necessitates one more passage. For this reason the sequential rows of products must be supplied from the first belt at reduced speed or be widely spaced. Another shortcoming of the above art is that, if for any reason the lower belt must cease receiving the products, e.g. due to momentary cessation of the activity toward which they are being sent, either supply is suspended also by the first belt or the products are sent along the second belt without the possibility of subsequent automatic recovery for sending onto the third belt when it resumes activity.

The general purpose of the present invention is to overcome the above shortcomings by supplying a device for conveyance and translation between perpendicular belts which would act delicately but at great speed. In addition, another purpose is to supply an accumulation device capable of storing the products arriving to unload them even on the perpendicular belt.

SUMMARY OF THE INVENTION

In view of said purpose it has been sought to provide in accordance with the present invention a device for selective transfer of rows of products between a pair of conveyor belts, upper and lower respectively, arranged at right angles to each other and comprising a first upper conveyor belt for arrival of products having head ends arranged facing juxtaposed at the end of a second upper conveyor belt aligned therewith beneath the first and second belts there being perpendicular therewith a third lower conveyor belt, at least the head end of the first belt being supported by inclinable means toward the third belt for transfer toward it of the products conveyed and characterised in that beneath each facing end of the upper belts is a horizontal intermediate shelf with means for reception and unloading therefrom the products, at least the first intermediate shelf beneath the second upper belt being connected to means of inclination to be inclinable around a shaft near its rear end opposed to its head end to be movable between a horizontal position and an inclined position upward to be aligned with and ending at the end of the upper opposed belt inclined downward, at least the other shelf being connected to means of translation to be movable between a high position in which its head end is aligned juxtaposed to the head end of the first shelf in a horizontal position and a low position with head end juxtaposed to the corresponding edge of the lower belt, the first belt inclining downward upon the arrival on the first upper belt of products to be transferred and the first shelf inclining upward with its means of reception and unloading driven to receive the products therefrom, said first shelf rotating in the horizontal position and its means being driven simultaneously with the means of the other facing shelf for passage of the products onto said other shelf, said other shelf moving into the low position and its means of reception and discharge being driven to unload the products onto the third belt.

As another innovative characteristic the second upper belt can have the head end supported by downward inclinable means, the first intermediate shelf being also connected to translation means to be movable between a high position in which its head end is aligned juxtaposed to the head end of the other shelf in a horizontal position and a low position with head end juxtaposed with the corresponding edge of the lower belt, the other intermediate shelf being also connected to means of inclination to be inclinable around an axis near its end opposed to its head end to be movable between the horizontal position and a position inclined upward to be aligned with and ending at the end of the second upper belt inclined downward so as to be able to transfer onto the third belt also products arriving on the second belt.

To clarify the explanation of the innovative principles of the present invention and its advantages compared with the known art there is described below with the aid of the annexed drawings a possible embodiment by way of non limiting example applying said principles. In the drawings:

THE DRAWINGS

FIG. 1 shows a schematic partial perspective view of a device in accordance with the present invention, FIGS. 2, 3 and 4 show side views, again schematic but with greater detail than FIG. 1, of a movement mechanism for the device, and FIGS. 5-8 show schematically operational sequences of the device of FIG. 1.

DETAILED DESCRIPTION OF THE PREFERRED EMBODIMENTS

Figure 1:
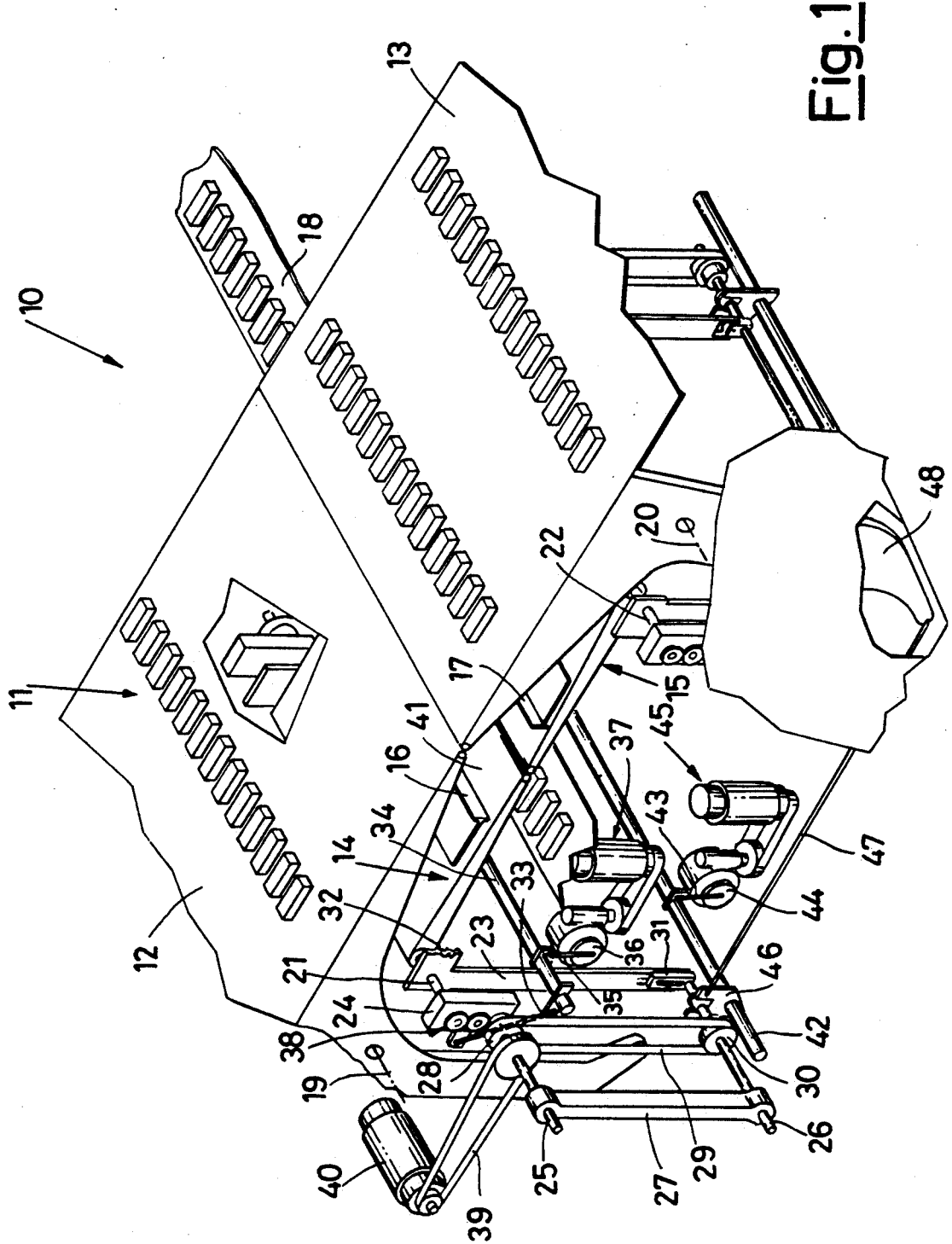

With reference to the figures FIG. 1 shows schematically a device, indicated as a whole by reference number 10, for conveyance, accumulation and translation between perpendicular belts of products arriving for example aligned in spaced parallel rows or ranks 11. The device comprises a first belt 12 for supply of the products with its arrival end arranged facing a head end of a second aligned belt 13. In this manner when the upper runs of belts 12 and 13 travel in the same direction, e.g. to the right in FIG. 2, the products 11 can pass from one belt to the other without problems. Beneath the belts 12 and 13 are arranged corresponding shelves 14 and 15 facing each other and each with means of reception and unloading of products, e.g. formed of a conveyor belt with a pusher 16 or 17 arranged on its upper run. Beneath the shelves 14 and 15 is arranged a transverse belt 18 for removal of the products.

As is clear also from a comparison of FIGS. 5-8 the two facing ends of the upper belts 12 and 13 can be inclined independently downward by rotating around the axes 19, 20 respectively. Simultaneously, the opposite lower shelf 15, 14 aligns with the end of the belt rotated downward while inclining upward by means of rotation around a shaft 21, 22 near its outer end.

In addition to the ability of inclination, the shelves 14, 15 possess the ability to translate, withdrawing from each other and moving downward parallel to each other so as to align with the plane of the belt 18 and at the two sides thereof.

These movements and their purpose are clarified below in the description of the operation of a cycle of operations of the device.

Those skilled in the art can imagine varied kinematic mechanisms suitable for securing the movements described for the ends of the upper belts 12 and 13 and for the shelves 14 and 15. Particularly advantageous has however been found the mechanism described below with reference to FIGS. 1-4. Said mechanism being symmetrical to the vertical plane passing between the belts 12 and 13 it is described and shown with reference to the shelf 14 and belt 13, the mirror image of the mechanism part corresponding to the shelf 15 and belt 12 being intended. To allow simplification and better understanding of FIG. 1 some elements of the mechanism are arranged or conformed therein in a manner slightly different from that shown in FIGS. 2-4. These differences are easy to identify and inconsequential for those skilled in the art.

Figure 2:
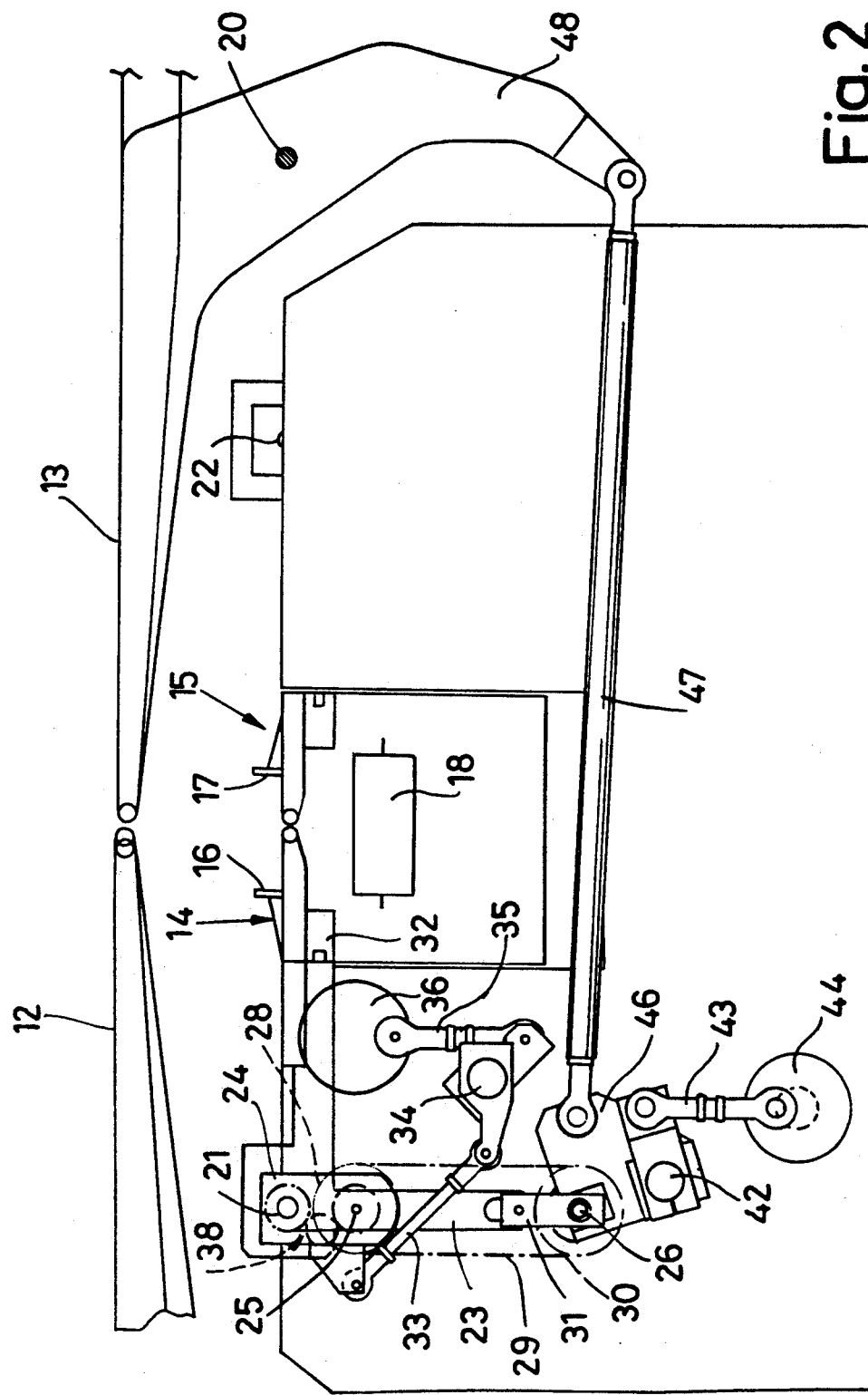
Figure 3:
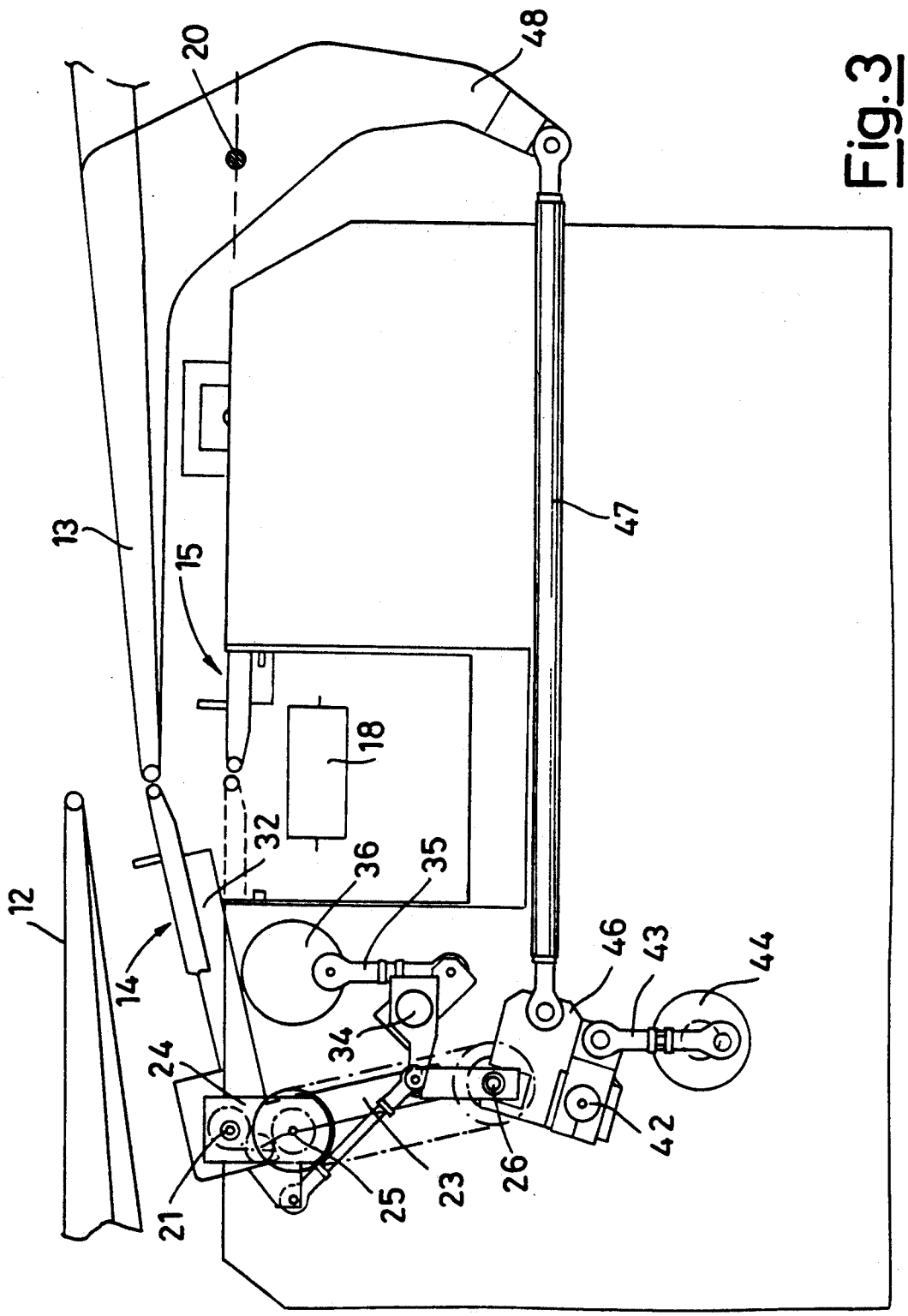
Figure 4:
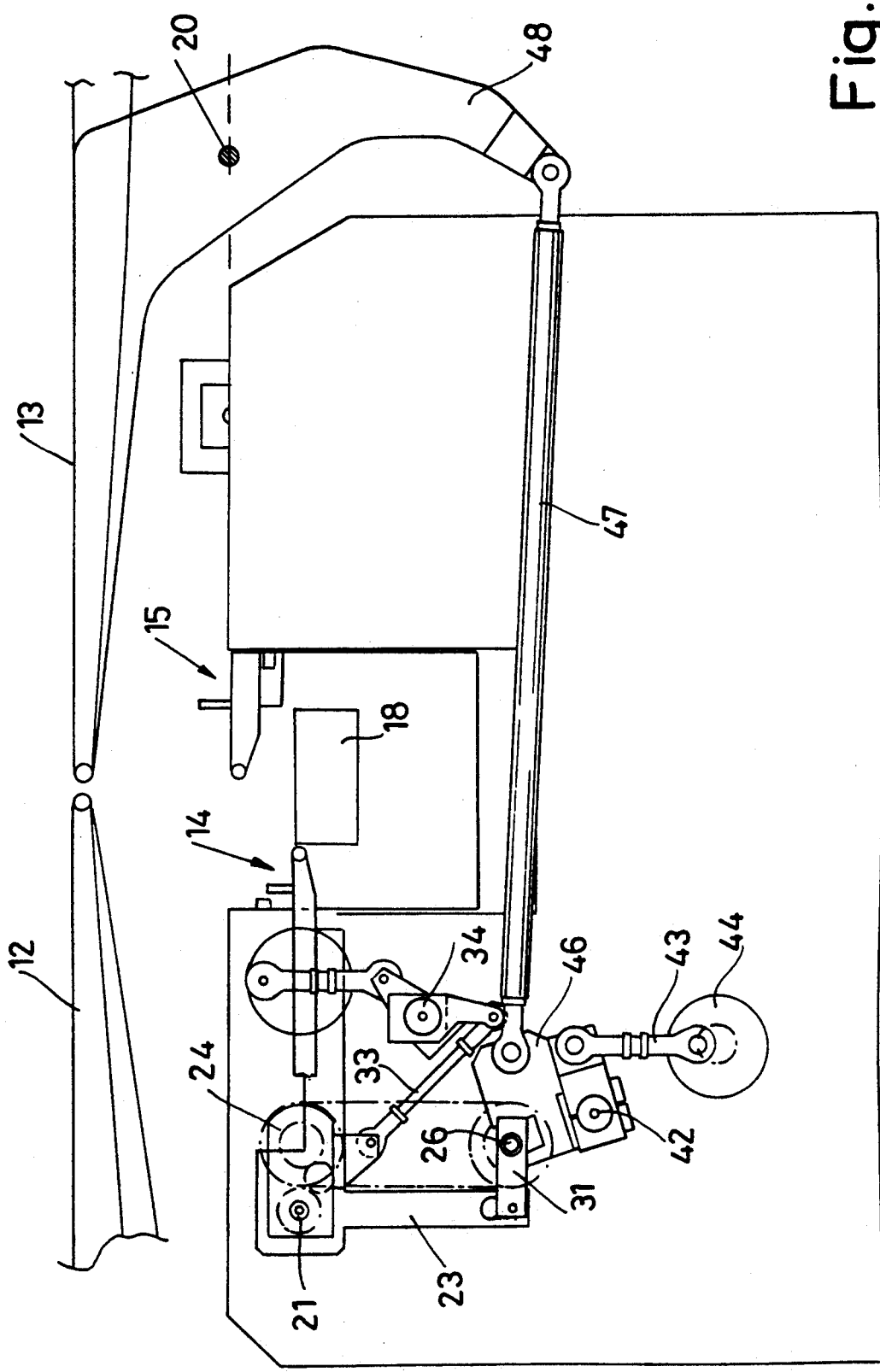
Figure 5:
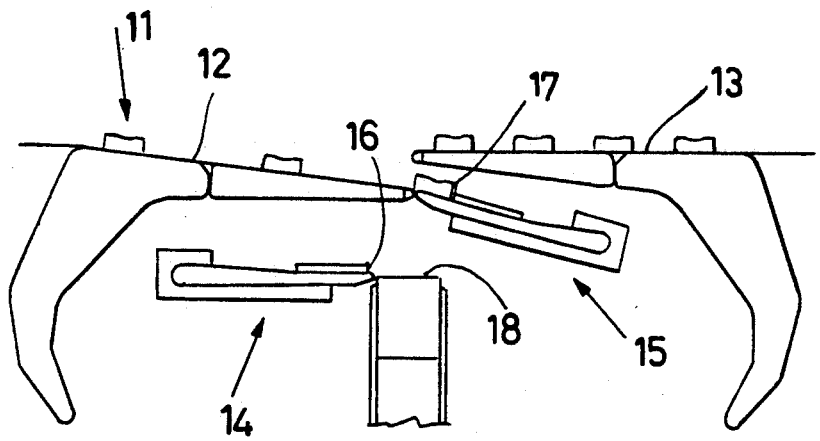

In FIGS. 2-4 the power sources implied in the movements are also removed.

As may be seen in FIGS. 1 and 2 the shaft 21 is supported freely rotating on a first element 24 having its other end supported freely rotating by an axle 25 in turn supported rotating by the machine frame.

On the shaft 21 is supported in a rotating manner a vertical element 23 with its lower end pivoted to a crank 31 integral with a second shaft 26 held at a fixed distance from the shaft 25 by a free connecting arm 27. The element 23 has an extension 32 for support of the shelf 14 realised for example with a conveyor belt 41. The element 24 is integrally constrained to a pulley 28 coaxial with the shaft 25. Said pulley is connected by a toothed belt 29 to a second pulley 30.

There is thus provided a parallelogram or jointed quadrilateral made up of the vertical element 23, 27 and the connecting elements 24, 31. In effect the crank 31 is, as clarified below, connected to the element 23 through a connection both rotating and sliding in the direction of the extension of the element 23. The presence of the belt 29 ensures however that the rotation of the element 24 around the shaft 25 is always equal to the rotation of the crank 31 around the shaft 26.

The upper element 24 is connected through a tierod 33 to a shaft 34 supported on the frame of the device and rotated through a tierod 35 and an eccentric 36 by a first gearmotor 37.

With reference to FIGS. 2 and 4 it is seen that with rotation of the eccentric 36 the shelf 14 while remaining always parallel with itself moves from the upper position aligned butted with the shelf 15 to the lower position backed off aligned with the edge of the lower belt of removal 18.

The mechanism is completed by a shaft 42 supported on the frame and which completes one rotation by means of a tierod 43 connected to an eccentric 44 moved by a gearmotor 45. The shaft 42 supports integrally a fork 46 embracing the shaft 26 and connected through a tierod 47 to an arm 48 with fulcrum at 20 to bring about the above mentioned inclination movement of the end of the upper belt 13. As may be seen from a comparison of FIGS. 2 and 3, by operating the gearmotor 45 the fork 46 moves the shaft 26, inclining upward the shelf 14 while through the tierod 47 it inclines downward the end of the belt 13. Thanks to the dimensioning of the parts the head of the belt 13 faces the head of the belt 41 (FIG. 3). The sliding connection between the element 23 and the crank 31 provides said movements without interfering with the position of the shaft 21. The inclination movement of the shelf is hence pure rotation around the shaft 21. As may be seen in FIG. 1 the movement of the conveyor arranged on the shelf 14 is provided through the rotation of the shaft 21 which is integral with an end roller of the belt 41 on the shelf. The shaft 21 is rotated by a cascade of three identical gears 38 supported on the element 24, the intermediate gear being free while the end gears are integral with the shaft 21 and the shaft 25 respectively. The shaft 25 is in turn connected through a shaft 39 to a motor 40. In this manner, upon rotation of the motor 40 the conveyor belt 14 slides consequently. In addition, as may be readily imagined by those skilled in the art, when inclination of the shelf is commanded, the presence of the intermediate gear in the cascade 38 causes the belt 41 not to slide unless commanded by the motor 40. It is now clear that the required inclination and translation movements can be provided.

FIGS. 5-8 show a possible sequence of operations. The products 11 are fed in rows or ranks ordered along the belt 12. Holding the belt 12 horizontal they proceed undisturbed along the belt 13 at the same speed. To transfer to the belt 18 a row of products, e.g. signalled by a photoelectric barrier of the known art and therefore not shown, simultaneous inclination of the belt 12 and the shelf 15 is commanded so that they move to the position of FIG. 5. The row of products is collected on the shelf 15 whose belt is moved at the same speed as the belt 12, also fulfilling the function of alignment of the products against the pusher 17. After receiving the row of products, the belt 12 and the shelf 15 can return to the horizontal position. The shelf 15 aligns thus with the facing shelf 14. The simultaneous and synchronised operation of the belts of the two shelves allows rapid transfer of the products from the shelf 15 to the shelf 14

Figure 6:
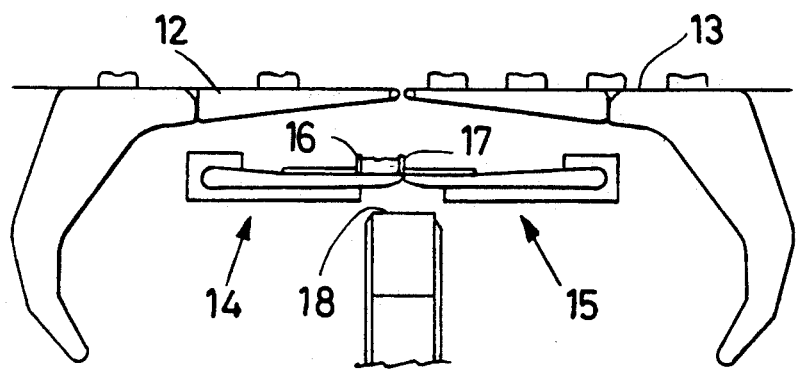

(FIG. 6). The products being guided in front and in back by the pushers 16 and 17, the transfer is perfect even if performed at very high speeds and accelerations.

Figure 7:
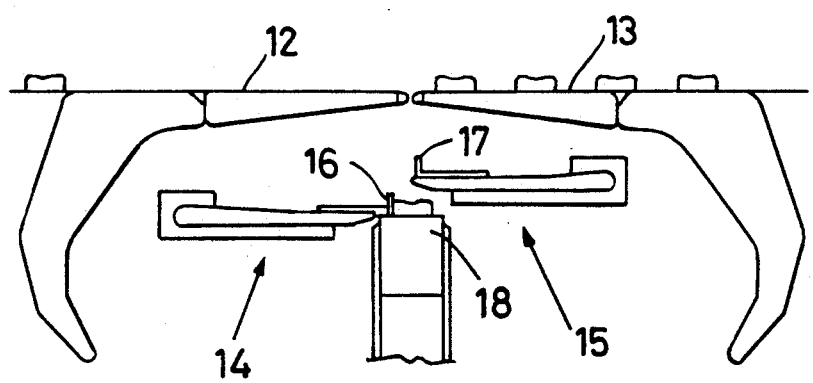
Figure 8:
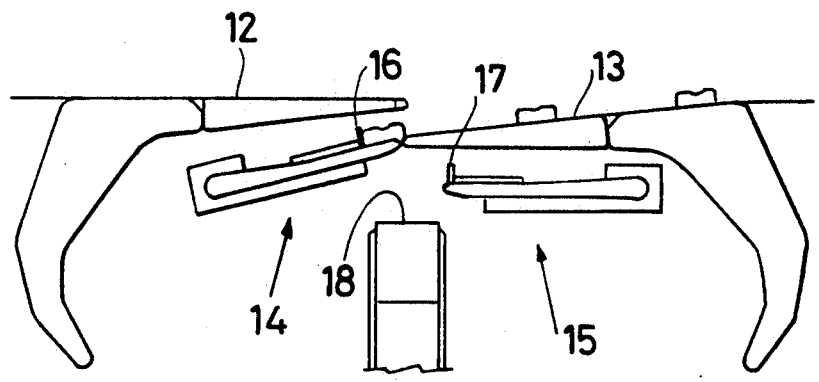

The shelf 14 then completes its backing and lowering movement to the level of the belt 18 and the operation of the pusher 16 unloads the row ordered on the belt 18 to be removed (FIG. 7). In the meantime the shelf 15 is ready to receive the next row of products. The rows of products which cannot be passed for any reason directly to the shelf 15 continue on the belt 13 to go to a subsequent station or to be held back while waiting to be recycled. The recycling takes place by reversing the direction of travel of the belt 13 when there is a pause condition in arrival of the products on the belt 12. The device begins to operate similarly to what was described above for the belt 13 which sends rows of products onto the shelf 14 (FIG. 8). Since they can proceed at a relatively low speed, the shelf 14 can drop to unload directly onto the belt 18. As an alternative, if the speed of the products makes it advisable, it is also possible to have a passage from the shelf 14 to the shelf 15 and therefrom to the belt 18 so as to have operation substantially symmetrical to that for the products arriving from the belt 12. Recirculation and normal supply from the belt 12 can be alternated to optimise for example occasional wait times in the supply of the products along the belt 12. It is now clear that the purposes set have been reached. In addition, the great flexibility of a device provided as described is clear. For example, the machine being symmetrical, it is easy to change the direction of supply of products in a system without large complications and changes. Naturally the above description of an embodiment applying the innovative principles of the present invention is given merely by way of example and therefore is not to be taken as a limitation of the patent right claimed here.

For example, the kinematic mechanisms of inclination and translation of the shelves and inclination of the upper belts can be different from those described to adapt dimensionally to peculiar requirements of the installation. In addition, the cycle described is an example and other cycles can be imagined thanks to the great flexibility of the device. For example, if the speed of arrival of the rows of products allows (for example if there is a temporary greater spacing between the rows), the receiving shelf for the products from the upper belt can perform, in addition to the rotation, the retraction and lowering movement to unload directly the product on the belt 18. Lastly, as may be readily imagined, the movement of the means of inclination and translation of the shelves can be provided with any actuator, e.g. a piston, and not necessarily an electric motor.

I claim:

1. A device for selective transfer of rows of products between a pair of conveyor belts arranged to travel at right angles to each other and comprising a first upper conveyor belt (12) for delivery of products (11), a second upper conveyor belt (13) normally aligned with said first upper belt and with the head end thereof facing upon the head end of said first upper belt to receive products (11) therefrom, and a third conveyor belt (18) positioned beneath said first (12) and second (13) belts and being perpendicular thereto, at least said head end of said first belt (12) being supported for inclination selectively downwardly toward said third belt (18) to effect transfer thereto of the products conveyed by said first belt, and characterised in that beneath the respective facing head ends of the upper belts (12, 13) are positioned two horizontal intermediate shelves (14, 15) each with means thereon for reception of an unloading therefrom of said products, one of said intermediate shelves (15) being positioned beneath said second upper belt (13) and being connected adjacent one end thereof for pivotal movement around a shaft (22) between a horizontal position and a position inclined upwardly to cause the opposite end thereof to be aligned with and confronting said head end of said first belt (12) when the latter has been inclined downward toward said third belt, the other of said shelves (14) being connected to means of translation to be movable thereby between a high position in which a head end thereof if aligned and juxtaposed to said head end of the first shelf (15) when the latter is in a horizontal position, and a low position in which said head end thereof is juxtaposed to one edge of the third belt (18), means for inclining the first belt (12) downwardly upon the arrival on the first belt (12) of products (11) to be transferred, and inclination means for inclining said one shelf (15) upwardly with its means of reception and unloading driven to receive the products from said first belt, said one shelf (15) upon rotating into its horizontal position having its reception and unloading means being driven simultaneously with the reception and unloading means of said other shelf (14) for passage of the products onto said other shelf (14), and means for moving said other shelf (14) into the low position thereof, and to operate its means of reception and discharge thereby to unload the products onto said third belt (18).

2. Device in accordance with claim 1 characterized in that the second upper belt (13) has its head end supported for inclination selectively downwardly, said one intermediate shelf (15) being also connected to translation means to be movable thereby between a high position in which the head end of said one shelf is aligned and juxtaposed to the head end of said other shelf (14) when the latter is in a horizontal position, and a low position with said head end thereof juxtaposed to the other edge of said third belt (18), said other intermediate shelf (14) being connected remote from said head end thereof for pivotal movement around a second shaft (21) between the horizontal position thereof and a position inclined upwardly to have said head end thereof aligned with and ending at said head end of the second upper belt (13) when the latter is inclined downwardly so as to be able to transfer products arriving from the second upper belt (13) to the lower belt (18).

3. Device in accordance with claim 2 characterized in that upon movement thereof between said high position and said low position thereof said one shelf (15) is also mounted for movement horizontally between an advanced position and a backed off position.

4. Device in accordance with claim 1 characterized in that upon movement between said high position and said low position thereof the other shelf (14) is also mounted for movement horizontally between an advanced position and a backed off position.

5. Device in accordance with claim 1 characterized in that the means of reception and unloading of each shelf (14,15) comprise a conveyor belt (41) mounted on each of said shelves for sliding of the products along the shelf.

6. Device in accordance with claim 5 characterized in that said conveyor belt (41) of each shelf (14,15) comprises pushers (16,17) projecting from the surface of said belt to butt against one side of the products on the belt (41).

7. Device in accordance with claim 2 characterized in that in their high positions the two shelves (14,15) have the head ends thereof confronting on a vertical plane extending between said head ends of the upper belts (12, 13), the third belt (18) being arranged with the centre thereof lying along said vertical plane.

8. Device in accordance with claim 2, characterized in that each of said translation means to which an associated one of said shelves is connected comprises a first substantially vertical element (23) supporting integrally the associated shelf to which in turn is connected a pivot by parallel connection elements (24, 31), a second element (27) substantially vertical and parallel to said first element to form a jointed quadrilateral, at least one of said connection elements (24 and 31) being kinematically connected to means of rotation around a pivot of the quadrilateral to move the first element (23) and thus said shelf between said high and low positions thereof, and simultaneously between said advanced and backed off positions thereof.

9. Device in accordance with claim 8 characterized in that said rotation means comprise a tierod (33) connected at one of its ends to said one connection element (24,31) and at the other end thereof to one end of a lever pivoted to rotate around a further shaft (34) for kinematic connection to a first movement actuator (37).

10. Device in accordance with claim 9 characterized in that the kinematic connection comprises a tierod (35) connected between the other end of said lever and an eccentric (36) connected for its rotation to said first movement actuator (37).

11. Device in accordance with claim 9 characterized in that the first movement actuator (37) is an electric motor.

12. Device in accordance with claim 8 characterized in that the inclination means comprise means of rotation of the quadrilateral around one of its pivots.

13. Device in accordance with claim 12 characterized in that the means of rotation comprise a fork (46) embracing another pin (26) of articulation of the quadrilateral, said fork (46) rotating around a fixed shaft (42) by kinematic connection to a second movement actuator (45).

14. Device in accordance with claim 13 characterized in that the kinematic connection comprises a tierod (43) connected between a lever for rotation of the fixed shaft (42) and an eccentric (44) connected for its rotation to the second actuator (45).

15. Device in accordance with claim 13 characterized in that the second movement actuator is an electric motor.

16. Device in accordance with claim 13 characterized in that the fork (46) is connected by a tierod (47) to an arm (48) for inclination of the end of the upper belt opposite the shelf inclined by the fork, for the simultaneous inclination of the end of the upper belt and of said opposite shelf upon operation of the second movement actuator (45).

17. Device in accordance with claim 13 characterized in that the connection element (31) and the vertical element (23) parallel to the vertical element (27) interconnected to the connection element (31) by the articulation pivot (26) embraced by the fork (46) are connected together in a sliding manner, the articulation pivots (25,26) on said vertical element (23) being connected together by a belt transmission (29) for the simultaneous rotation of the connection elements (24,31).

18. Device in accordance with claim 13 characterized in that the upper connection element (24) supports a geared chain (38) for transmission of motion of a motor (40) to the means of reception and unloading for their commanded operation.

* * * * *